(12) United States Patent
Bitsche et al.

(10) Patent No.: US 7,026,733 B2
(45) Date of Patent: Apr. 11, 2006

(54) DRIVE SYSTEM FOR A MOTOR VEHICLE HAVING AN ELECTRIC MACHINE

(75) Inventors: Otmar Bitsche, Stuttgart (DE); Uwe Schaefer, Stuttgart (DE); Yehia Tadros, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/371,229

(22) Filed: Feb. 24, 2003

(65) Prior Publication Data
US 2004/0001314 A1 Jan. 1, 2004

(30) Foreign Application Priority Data
Feb. 22, 2002 (DE) ............................. 102 07 486

(51) Int. Cl.
*H02K 5/18* (2006.01)
*H02K 5/20* (2006.01)
*H02K 9/08* (2006.01)

(52) U.S. Cl. ..................... 310/68 R; 310/52
(58) Field of Classification Search ........... 310/68 R, 310/68 A, 68 D, 75 R, 96, 98, 99, 58, 52
See application file for complete search history.

(56) References Cited

U.S. PATENT DOCUMENTS

| | | | |
|---|---|---|---|
| 3,562,564 A | | 2/1971 | Potter |
| 5,643,119 A | * | 7/1997 | Yamaguchi et al. ........... 475/5 |
| 5,812,388 A | * | 9/1998 | Keidar et al. ................. 363/145 |
| 5,929,543 A | * | 7/1999 | Zeyen et al. ................... 310/54 |
| 6,052,655 A | * | 4/2000 | Kobayashi et al. ......... 702/184 |
| 6,169,344 B1 | | 1/2001 | Tsuruhara |
| 6,184,600 B1 | * | 2/2001 | Asao et al. .................... 310/64 |
| 6,538,352 B1 | * | 3/2003 | Asao ......................... 310/68 D |
| 6,552,908 B1 | * | 4/2003 | DeNardis ..................... 361/709 |
| 6,577,031 B1 | * | 6/2003 | Morooka et al. .......... 310/68 R |

FOREIGN PATENT DOCUMENTS

| | | |
|---|---|---|
| DE | 33 32 515 A1 | 3/1985 |
| GB | 2284943 | 6/1995 |
| JP | 04000242 | 1/1992 |
| JP | 411332001 | * 11/1999 |

OTHER PUBLICATIONS

English Language Abstract of JP 04000242 A.
M. Alakuela et al., "A 40 KW Switched Reluctance Engine Starter/ Generator System for an Electric Hybrid Vehicle", EPE '97, European Conference on Power Electronics and Applications, Sep. 8, 1997, pp. 4.717-4.720, vol. 4, Conf. 7, EPE Association, Brussels, Germany, XP-000768219.

* cited by examiner

*Primary Examiner*—Tran Nguyen
(74) *Attorney, Agent, or Firm*—Crowell & Moring LLP

(57) ABSTRACT

A drive system for a transportation device having an electric machine. The electric machine has a converter unit and a cooling unit with the converter unit being embodied at least partially in the shape of a ring and surrounding the electric machine or components of the electric machine.

13 Claims, 2 Drawing Sheets

DRIVE SYSTEM FOR A MOTOR VEHICLE HAVING AN ELECTRIC MACHINE

BACKGROUND AND SUMMARY OF THE INVENTION

This application claims the priority of German Application No. 102 07 486.0-32, filed Feb. 22, 2002, the disclosure of which is expressly incorporated by reference herein.

The invention relates to a drive system for a means of transportation.

The German laid-open application DE 33 32 515 A1 discloses an electric machine which has a converter device for actuation purposes. The converter device is installed in a terminal box on a planar contact face. The terminal box is provided in the housing wall of the electric machine.

Japanese Reference JP 04-000242 A (Patent Abstracts of Japan) discloses a motor in which an electronic motor system is integrated. A cooling system composed of a reservoir and two lines for the cooling fluid is provided between the electronic motor system and the motor.

In customary drive systems for vehicles there is little space available so that the installation of further components usually requires expensive restructuring.

The object of the invention is to make available a drive system which requires as little installation space as possible.

The drive system according to the invention has the converter unit and electric machine integrated in an installation-space-saving way. As a result, the need for connecting parts can be avoided. Furthermore, only one cooling unit is provided, and it is used to cool both the converter unit and the electric machine. As a result, multiple cooling circuits can advantageously be avoided and a saving in components can be achieved. This has advantageous effects on weight, installation space requirements and cost. The integrated design also leads to an improvement in the electromagnetic compatibility. This is particularly important in modern vehicles which usually contain a plurality of electric components such as controllers, for example.

Other objects, advantages and novel features of the present invention will become apparent from the following detailed description of the invention when considered in conjunction with the accompanying drawings.

BRIEF DESCRIPTION OF THE DRAWINGS

Further advantageous refinements of the invention emerge from the exemplary embodiments illustrated below with reference to the drawings, in which.

DETAILED DESCRIPTION OF THE PREFERRED EMBODIMENTS

Figure 1:
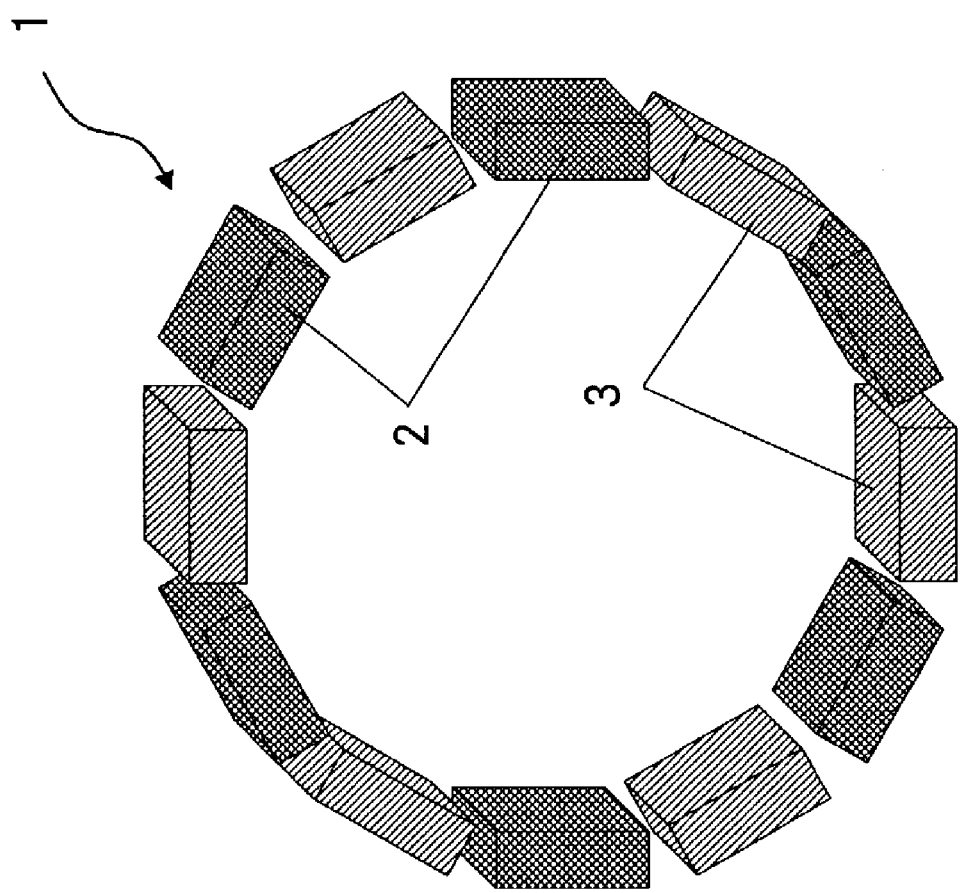
FIG. 1 is a schematic view of a preferred arrangement of a converter unit of a drive system according to the invention.

FIG. 1 is a schematic view of a preferred arrangement of a converter unit 1 of a drive system according to the invention. The converter unit 1 contains a typical electronic power system (not illustrated) for actuating an electric machine (not illustrated). This electronic power system includes, as is generally customary, half bridges or half bridge arrangements, each phase of the electric machine being assigned one half bridge or half bridge arrangement. The half bridge arrangements are supplied via an intermediate circuit (not illustrated) with electrical energy from a voltage source (not illustrated) and/or power source. A traction battery, a Supercap or else a generator which is driven by the internal combustion engine can be used, for example, as the voltage source. Each half bridge arrangement usually includes two switching elements (not illustrated) which are connected in series with one another. Power semiconductors such as IGBTs, MOSFETs and/or thyristors such as GTOs (Gate Turn-Off Thyristor), for example, are used as switching elements. It is also possible to use relays. The phases of the electric machine which are not illustrated are usually connected between the switching elements by means of lines (not illustrated). The switching elements are usually assigned diodes, referred to as freewheeling diodes or backflow diodes (not illustrated), which are usually arranged in a antiparallel configuration to the switching elements. Antiparallel is understood to mean that the direction of current flow through the diodes is opposed to the preferred direction of current flow through the switching elements. The switching elements are typically actuated by means of an actuation system (not illustrated), for example a controller. The actuation is usually carried out using pulse-width-modulated clocking signals, control of the current and/or rotational speed of the electric machine being possible by means of the pulse width.

The converter unit 1 is, as illustrated in FIG. 1, preferably embodied in the shape of a ring. The converter unit 1 can, if it appears expedient, for example for reasons specific to installation space, also be partially embodied in the shape of a ring. In the shape of a ring or partially in the shape of a ring is understood to mean that the converter unit 1 is arranged on a circle or a circular arc. This means that the converter unit 1 can be embodied as a module component which is in the shape of a ring or partially in the shape of a ring. Alternatively, the converter unit 1 can also be composed of a plurality of modules 2, 3 which are, for example, rectangular or in the shape of a parallelepiped and are arranged in the shape of a circle or in the shape of a circular arc. This is the case in the embodiment illustrated in FIG. 1. The individual converter modules 2, 3 can be connected to one another fixedly connected. However, they can also be connected indirectly, for example by means of lines (not illustrated). The converter modules 2, 3 are preferably in the shape of parallelepipeds.

The converter unit 1 may also be embodied in an oval or ellipsoidal shape or it may be arranged on an oval or an ellipse or on part of an oval or an ellipse if this is necessary for reasons of assembly. It may be composed, for example, of modules 2, 3 which are arranged in the shape of an oval or ellipse.

The converter unit preferably comprises at least one first converter module 2 and at least one second converter module 3. Each converter module 2, 3 preferably has a semiconductor element or what is referred to as a semiconductor chip. The first converter module 2 contains a switching element (not illustrated), for example a IGBT, and advantageously what is referred to as a free-wheeling diode (not illustrated), which is arranged in an antiparallel configuration to the switching elements. The second converter module 3 preferably comprises an energy store (not illustrated) and/or a capacitor (not illustrated), preferably an intermediate circuit capacitor. The capacitor is used to smooth the signals present at the intermediate circuit, in particular the current and the voltage. An electrolytic capacitor can be used as the capacitor. It is also possible to use a layer stack capacitor or a capacitor which has been produced using layer stack technology.

Each phase of the electric machine is preferably connected to two first converter modules 2 whose switching elements are connected as a half bridge. In the case of multi-step converter circuits it is also possible to assign a plurality of first converter modules 2 to one phase. Furthermore, each phase of the electric machine is preferably assigned two second converter modules 3. The first converter modules 2 and second converter modules 3 form the ring or the partial ring shape of the converter unit 1 and are preferably arranged in an alternating fashion. This leads to short connections between the first converter modules 2 and the second converter modules 3 and therefore to low (line) inductance.

In one preferred embodiment, a total of six first converter modules 2 and six second converter modules 3 are provided in a three-phase machine, the first converter modules 2 and the second converter modules 3 being arranged alternately. The number of first and second converter modules 2, 3 is correspondingly adapted for electric machines with more or fewer phases.

Owing to the ring shape or partial ring shape of the converter unit 1, it is possible to arrange it neatly on an electric machine as such a machine usually has cylindrical components, for example laminated rotor core and laminated stator core.

Figure 2:
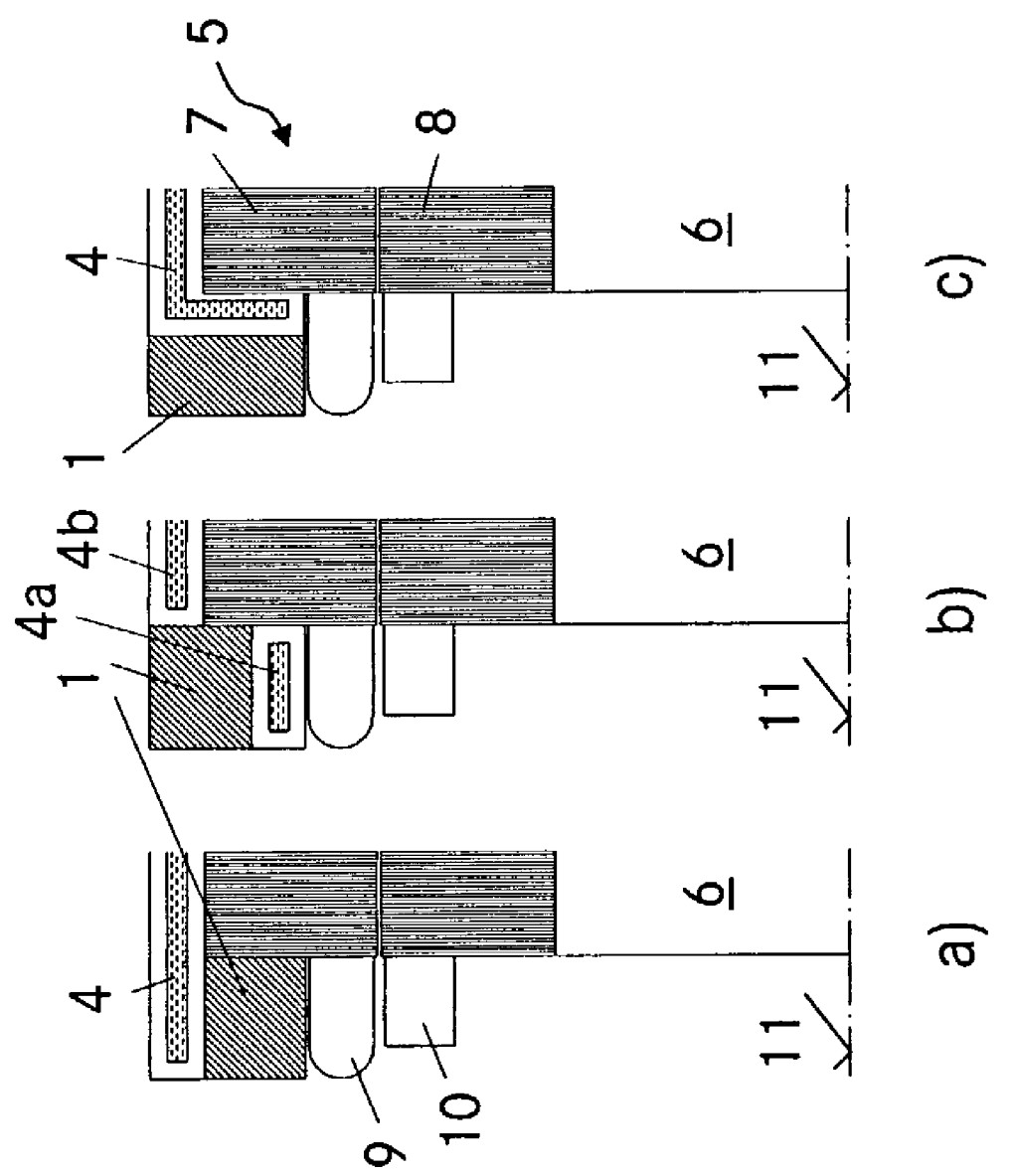
FIG. 2 is a schematic detailed view of a longitudinal section through a first embodiment (a), a second embodiment (b) and a third embodiment (c) of a drive system according to the invention.

FIG. 2 is a schematic view of part of a longitudinal section of a first embodiment (a), of a second embodiment (b) and of a third embodiment (c) of a drive system according to the invention with an electric machine. Identical reference symbols designate identical components. The part which is arranged above an axis 11 is symmetrical with a part (not illustrated) which is arranged below the axis 11. An asynchronous machine, for example, can be used as the electric machine. The electric machine is composed of a stator 5 with a laminated stator core 7 and a winding head 9 and of a rotor 6 with a laminated rotor core 8 and a short-circuiting ring 10. Furthermore, the drive system has a cooling unit 4. The cooling unit 4 can provide cooling with a liquid coolant, for example water or oil, and/or gaseous coolant, for example ambient air. In the longitudinal section, the winding head 9 and short-circuiting ring 10 protrude out laterally beyond the laminated stator core 7, or laminated rotor core 8, respectively.

FIG. 2a) represents a first preferred embodiment in which the converter unit 1 surrounds the protruding or projecting part of the winding head 9 of the stator 5 in the shape of a ring or partially in the shape of a ring and is arranged next to the laminated stator core 7, preferably fixedly connected. The part of the converter unit 1 which lies furthest out from the axis 11 preferably forms, with the laminated stator core 7, a straight line which runs parallel to the axis 11, that is to say the converter unit 1 is preferably flush with the laminated stator core 7. The cooling unit 4 is embodied as a preferably cylindrical cooling jacket which surrounds the laminated stator core 7 and the converter unit 1 at least partially in the shape of a ring. The converter unit 1, cooling unit 4 and winding head 9 are preferably flush with one another, that is to say they preferably form a straight line perpendicular to the axis 11.

This embodiment is distinguished by a simple structure, a high thermal loading capacity and a short connection between the converter unit 1 and electric machine.

FIG. 2b) represents a second preferred embodiment in which a first cooling unit 4a and a second cooling unit 4b are provided. The first cooling unit 4a is preferably embodied as a cylindrical cooling jacket and surrounds the protruding or projecting part of the winding head 9 of the stator 5 in the shape of a ring or partially in the shape of a ring. It is arranged, preferably fixedly connected, next to the laminated stator core 7. The converter unit 1 in turn surrounds the coolant unit 4a in the shape of a ring or partially in the shape of a ring. The cooling unit 4b is also preferably embodied as a cylindrical cooling jacket which surrounds the laminated stator core 7 at least partially in the shape of a ring. The part of the converter unit 1 which lies on the outside furthest away from the axis 11 preferably forms a straight line which runs parallel to the axis 11, that is to say the converter unit 1 is preferably flush with the cooling unit 4b. The converter unit 1, cooling unit 4a and winding head 9 are preferably flush with one another, that is to say they preferably form a straight line perpendicular to the axis 11.

This embodiment is distinguished by good cooling of the converter unit 1 and of the electric machine.

FIG. 2c) illustrates a preferred third embodiment in which the cooling unit 4 surrounds the laminated stator core 7 in the form of a ring or partially in the form of a ring. The cooling unit 4 is embodied in such a way that it also includes the end side of the laminated stator core 7. The cooling unit 4 preferably bends over at the end of the laminated stator core 7 and covers the coolant core 7 until the cooling unit 4 adjoins the winding head 9. The converter unit 1 surrounds the protruding or projecting part of the winding head 9 of the stator 5 in the shape of a ring or partially in the shape of a ring and is arranged next to the bent-over part of the cooling unit 4, preferably fixedly connected.

This embodiment is distinguished by a simple design and good cooling of the electric machine and of the converter unit 1.

In a further embodiment (not illustrated) the converter unit 1 is arranged on an end side of the electric machine. The cooling unit or part of the cooling unit 4 projects, in this embodiment, beyond the stator 5, for example by means of a further bend in the cooling unit (illustrated in FIG. 2c)) in the longitudinal direction and is connected to the converter unit 1, preferably fixedly connected.

The converter unit 1 and cooling unit 4, 4a, 4b are preferably arranged in a symmetrical design on each end side of the electric machine.

The electric machine, the converter unit 1 and the cooling unit 4, 4a, 4b are preferably arranged in a common housing.

The drive system according to the invention may be used as a starter/generator, as a motor/generator or else as a rotor, starter or generator. It can be used in a vehicle which is driven by an internal combustion engine, a fuel cell vehicle, a hybrid vehicle, an electric vehicle or a battery vehicle. The drive system may be used as main drive or as an auxiliary drive.

The drive system according to the invention is arranged in a vehicle, preferably between an internal combustion engine and a gearbox. Clutches or converters may preferably be arranged between the gearbox and the drive system and the internal combustion engine and the drive system. Bolts which are usually used to make a rigid connection between the internal combustion engine and the gearbox can be led through the converter unit 1. The bolts can alternatively be arranged outside the circumference of the drive system.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A drive system for a transporting device, said system comprising:
    an electric machine having a plurality of components including a stator with a stator core and a winding head, and a rotor;
    a converter unit formed at least partially in the shape of a ring and surrounding at least one of said plurality of components;
    wherein said converter unit includes at least two first converter modules and at least two second converter modules; and
    a cooling unit.

2. The drive system according to claim 1, wherein the converter unit is fixedly connected to the cooling.

3. The drive system according to claim 1, wherein the converter unit is fixedly connected to the electric machine.

4. The drive system according to claim 3, wherein the converter unit is fixedly connected to a stator of the electric machine.

5. The drive system according to claim 1, wherein the converter unit at least partially surrounds one of the electric machine and a component of the electric machine.

6. The drive system according to claim 1, wherein the converter unit is arranged on an end side of the electric machine.

7. The drive system according to claim 1, wherein at least one of the at least two converter modules and the at least two second converter modules are embodied in the shape of parallelepipeds.

8. The drive system according to claim 1, wherein each phase of the electric machine is assigned two of said at least two first converter modules and two of said at least two second converter modules.

9. The drive system according to claim 1, wherein the cooling unit comprises a cooling jacket which at least partially surrounds one of the electric machine and components of the electric machine along a circumference of the electric machine.

10. The drive system according to claim 9, wherein the cooling unit at least partially surrounds the converter unit along a circumference of the converter unit.

11. The drive system according to claim 10, wherein the converter unit is arranged between the cooling unit and one of the electric machine and a component of the electric machine.

12. The drive system according to claim 9, wherein the cooling unit is arranged between the converter unit and the electric machine.

13. The drive system according to claim 1, wherein the electric machine, converter unit and cooling unit are arranged in a common housing.

* * * * *